No. 671,737. Patented Apr. 9, 1901.
J. A. STONE.
CLUTCH FOR MOTOR WHEELS.
(Application filed Feb. 12, 1901.)
(No Model.) 2 Sheets—Sheet 1.
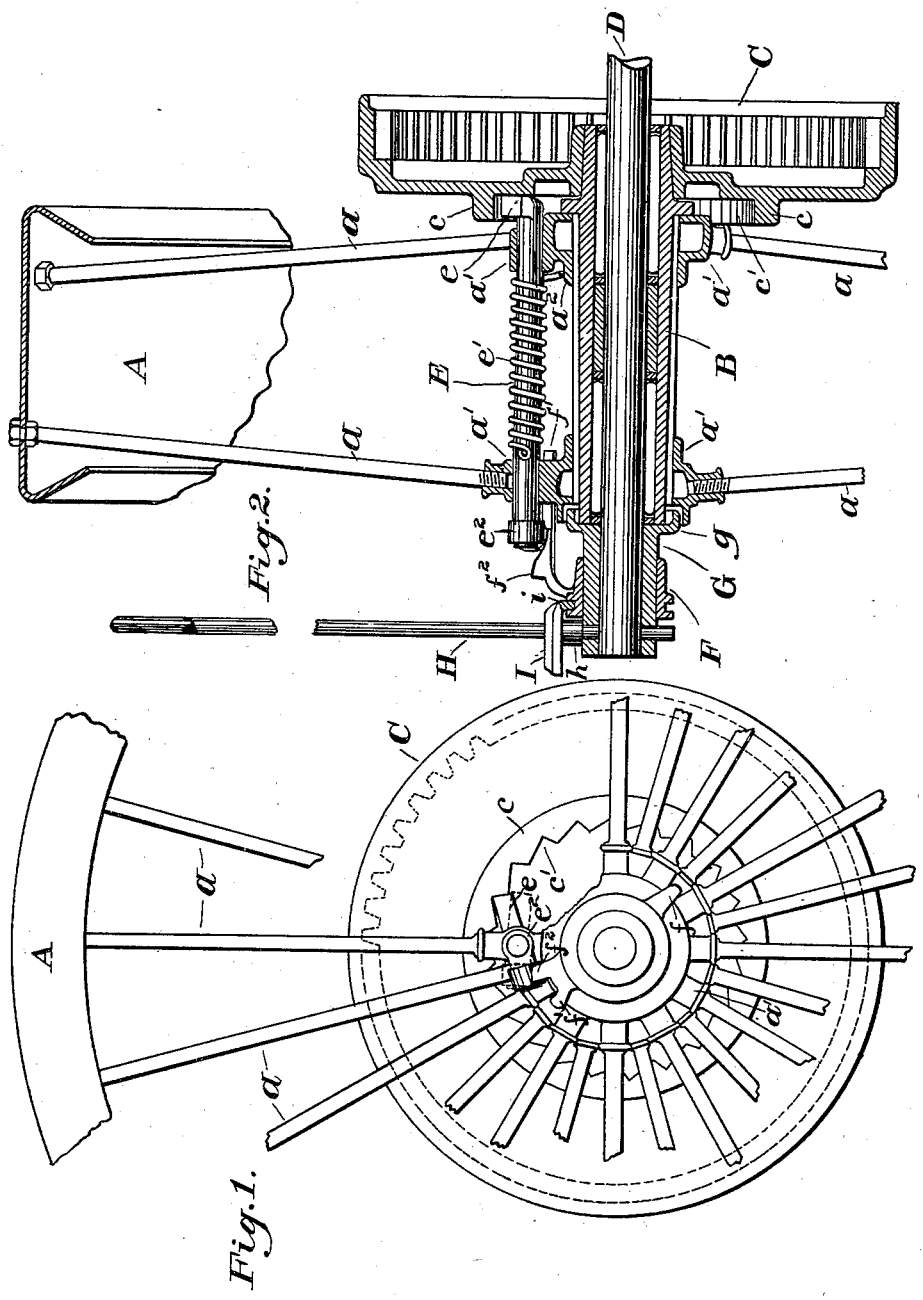
WITNESSES:
INVENTOR.
BY John A. Stone
J. F. Steward.
ATTORNEY.

No. 671,737. Patented Apr. 9, 1901.
J. A. STONE.
CLUTCH FOR MOTOR WHEELS.
(Application filed Feb. 12, 1901.)
(No Model.) 2 Sheets—Sheet 2.
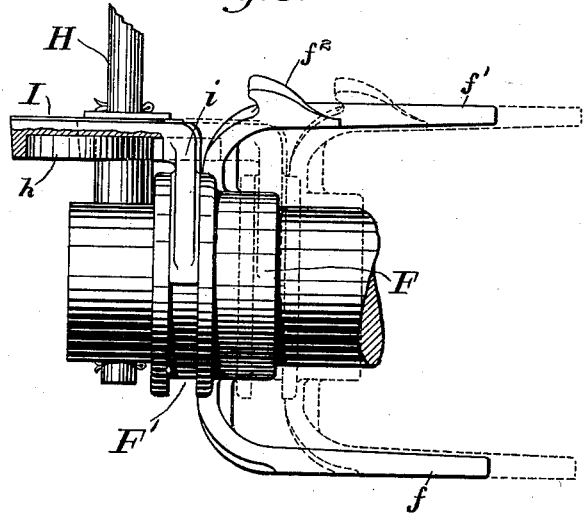
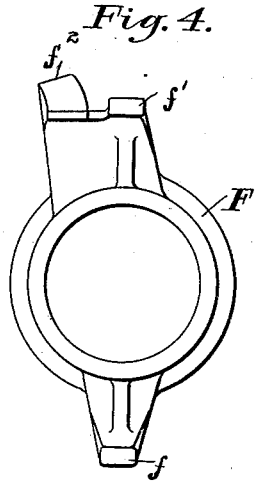
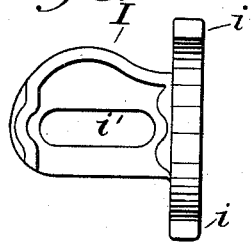
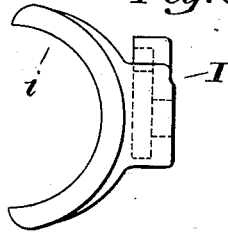
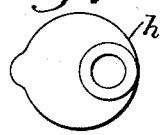
WITNESSES:
INVENTOR.
BY John A. Stone
J. F. Steward
ATTORNEY.

UNITED STATES PATENT OFFICE.

JOHN A. STONE, OF CHICAGO, ILLINOIS.

CLUTCH FOR MOTOR-WHEELS.

SPECIFICATION forming part of Letters Patent No. 671,737, dated April 9, 1901.

Application filed February 12, 1901. Serial No. 47,084. (No model.)

*To all whom it may concern:*

Be it known that I, JOHN A. STONE, a citizen of the United States, residing at Chicago, in the county of Cook and State of Illinois, have invented certain new and useful Improvements in Clutches for Motor-Wheels; and I do hereby declare the following to be a full, clear, and exact description of the invention, such as will enable others skilled in the art to which it appertains to make and use the same, reference being had to the accompanying drawings, forming a part of this specification, in which—

Figure 1 may be considered a stubble-side elevation of a traction-wheel for harvesting-machines, with parts broken away; Fig. 2, a front sectional view of the same. Figs. 3, 4, 5, 6, 7, and 8 are details.

A is the rim of the traction-wheel, and $a$ and $a$ are spokes secured in the usual manner to the hubs $a'$ and $a'$. Through these hubs extends the sleeve B, to which they are secured, and on this sleeve, at its end, is placed the internal gear C in such a manner as to normally be free thereon, but held to position by any suitable means.

$c$ is a flange cast upon the disk portion of the wheel C and having the internal ratchets $c'$.

D is the axle upon which the wheel rotates.

Through eyes formed near the bases of the spokes is the rock-shaft E, having upon its end the pawl $e$, adapted to engage the internal ratchet-teeth $c'$. In order that this shaft may act as a ratchet, a spring $e'$ is passed around it, one end secured to the said shaft by a pin and the other engaging the hub of the wheel at $a^2$. The action of this spring is such as to throw the pawl $e$ in contact with the ratchet-teeth. Upon the other end of the shaft E is secured the arm $e^2$ by pin or otherwise.

Upon the stubble end of the axle D the clutch-actuating mechanism is placed. It consists of a grooved sliding sleeve F, having the longitudinally-extending arms $f$ and $f'$. (See Fig. 3.) Upon the latter is formed the cam $f^2$. This cam, as will be seen by reference to Fig. 2, is in such position as to lie beneath the arm $e^2$. Both arms $f$ and $f'$ pass inwardly between the spokes of the wheel, so that the sliding sleeve is forced to rotate with the main wheel and the cam $f^2$ to be always retained in proper position relative to the arm $e^2$.

G is a collar upon the axle provided for the purpose of holding the wheel in proper position relative to the said axle. From preference it is formed with a sand-rim $g$. Any suitable means for holding the wheel in position may be substituted for G, and the sliding sleeve F may be adapted to slide directly on the axle. Through the axle extends the vertical bar H, having at its lower end the eccentric H. Lying above this eccentric, with forks $i\ i$, is the slide I. Through the slot $i'$ the vertical rod H passes. Above the latter a washer and pin are placed to prevent it from rising out of position. The forks $i$ lying within the groove F', it is plainly seen that if the rod H be turned in either direction the sliding sleeve F, its extensions $f$ and $f'$, and the cam $f^2$ will be moved longitudinally. With the parts in position shown in Fig. 2 the pawl $e$ is in contact with the ratchet $c'$. If now the rod is rotated, the grooved sliding sleeve and its extensions are moved to the positions shown in dotted lines in Fig. 3, in which case the shaft E is rocked and the pawl $e$ thrown out of engagement with the ratchet $c'$.

Having thus described my invention, what I claim as new, and desire to secure by Letters Patent, is—

A supporting-wheel having the shaft E passing eccentrically relative to the axis of said wheel, a ratchet placed beside said wheel and adapted to rotate upon an axis coincident with that of said wheel, a longitudinally-moving sleeve adapted to rotate with the said wheel upon an axis coincident with the said wheel, said sleeve provided with the cam $f^2$ adapted to rock the said shaft E, and means for moving the said sleeve longitudinally at will, substantially as described.

In testimony whereof I affix my signature in the presence of two witnesses.

JOHN A. STONE.

Witnesses:
CHAS. H. CHAMBERS,
J. W. DAVIS.